United States Patent [19]
Yoshizawa et al.

[11] Patent Number: 5,238,723
[45] Date of Patent: Aug. 24, 1993

[54] OPTICAL RECORDING MEDIUM

[75] Inventors: Atsushi Yoshizawa; Takashi Chuman; Yasushi Araki; Shuichi Yanagisawa; Fumio Matsui, all of Saitama, Japan

[73] Assignee: Pioneer Electronic Corporation, Tokyo, Japan

[21] Appl. No.: 862,374

[22] Filed: Apr. 2, 1992

[30] Foreign Application Priority Data

Aug. 20, 1991 [JP] Japan .................... 3-208004

[51] Int. Cl.$^5$ ............................ B32B 3/00
[52] U.S. Cl. ........................ 478/64; 428/65; 428/195; 428/411.1; 428/457; 428/913; 430/945; 346/76 L; 346/135.1
[58] Field of Search ............ 428/64, 65, 195, 411.1, 428/457, 913; 430/945; 346/76 L, 135.1

[56] References Cited

U.S. PATENT DOCUMENTS 4,752,554  6/1988  Sato et al. .................... 430/273
4,839,883  6/1989  Nagata et al. .................. 369/286

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

An optical recording medium, comprising: a light transparent substrate, a light absorbing layer disposed on the light transparent substrate, a light reflection layer disposed on the light absorbing layer, and a protection layer disposed on the light reflection layer, wherein the protection layer has been formed by curing a photo-setting resin which is capable of providing a glass transition point of not lower than 110° C., a shrinkage factor of not larger than 8%, and a water vapor permeability of not higher than 110 g/m$^2$·24 H after being cured. The optical recording medium having the above structure is capable of showing stable performances, even in an environment of high humidity.

9 Claims, 1 Drawing Sheet

OPTICAL RECORDING MEDIUM

FIELD OF THE INVENTION

The present invention relates to a writable optical recording medium and particularly to an optical recording medium which comprises a substrate having a light transmission, and a light absorbing layer and a light reflection layer disposed on the light transparent substrate.

BACKGROUND OF THE INVENTION

As a so-called writable optical recording medium, there has been known an optical recording medium which comprises a transparent substrate, a light absorbing layer comprising an organic coloring matter (or colorant) such as a cyanine type and a phthalocyanine type, a light reflection layer formed on the light absorbing layer, and a protection layer disposed on the light reflection layer. In the optical recording medium having such a structure, a laser light (or laser beam) is supplied thereto from the transparent substrate side thereof and the laser light is concentrated (or focused) on a minute area of the light absorbing layer so that it is converted into heat energy. As a result, the thus irradiated portion of the light absorbing layer is caused to have a different state or configuration (e.g., a pit is formed in such a portion), thereby to effect writing. On the other hand, a laser light (or laser beam) for reading is supplied to such an optical recording medium from the transparent substrate side thereof and is reflected by the light reflection layer. At this time, the resultant contrast between the quantity of the reflected light in a portion having the above pit formed therein and the quantity of the reflected light in a portion having no pit formed therein is detected and converted into an electric signal, thereby to effect reading.

In the conventional optical recording medium, however, the above protection layer which is disposed for the purpose of preventing the deterioration or scratch which can occur in the light absorbing layer and/or the light reflection layer, has been formed by applying a resin material such as an ultraviolet ray curing (or hardening) resin and a solvent type resin on the light reflection layer and hardening the resultant coating. In the conventional optical recording medium having the above protection layer, however, there is posed a problem such that the light absorbing layer and the light reflection layer are not sufficiently protected from the external force as described above.

More specifically, since the conventional protection layer has an insufficient humidity resistance (or resistance to humidity), it causes a crack or bonding failure (or local float or rise). As a result, there is posed a problem such that the electric potential in the mirror surface portion (Ro), the electric potential in the land/groove portion ($I_l$ and/or $I_g$), the tracking error potential (TE), etc., may be varied or decreased.

SUMMARY OF THE INVENTION

A principal object of the present invention is, in view of the above problems encountered in the prior art, to provide an optical recording medium which is capable of showing stable performances, particularly in an environment of high humidity.

According to the present invention, there is an optical recording medium, comprising: a light transparent substrate, a light absorbing layer disposed on the light transparent substrate, a light reflection layer disposed on the light absorbing layer, and a protection layer disposed on the light reflection layer, wherein the protection layer has been formed by curing a photo-setting resin which is capable of providing a glass transition point of not lower than 110° C., a shrinkage factor of not larger than 8%, and a water vapor permeability of not higher than 110 g/m$^2$·24 H after being cured.

In the optical recording medium according to the present invention having the above structure, since the protection layer formed on the light reflection layer has a glass transition point of not lower than 110° C. and a shrinkage factor of not higher than 8%, it hardly causes a crack or bonding failure (or local float or rise) even when the environmental conditions are varied. In addition, since the protection layer has a water vapor permeability of not higher than 110 g/m$^2$·24 H, the light absorbing layer and the light reflection layer may effectively be protected from an environmental change even under an environment of high humidity.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
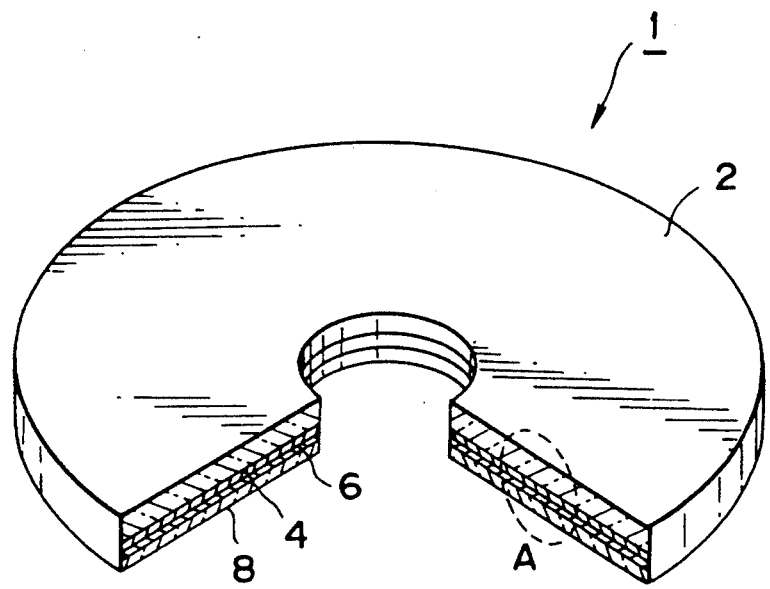
FIG. 1 is a partially cut away schematic perspective view showing an embodiment of the optical recording medium according to the present invention.
Figure 2:
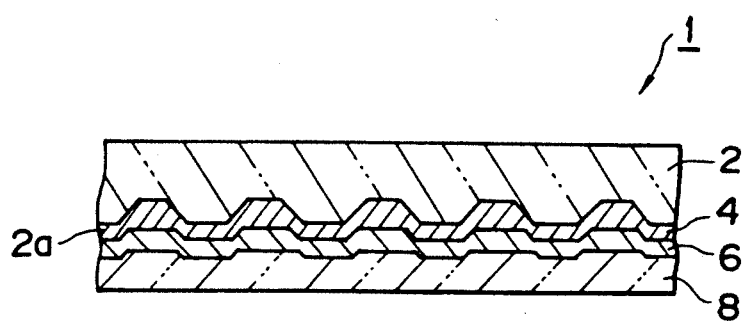
FIG. 2 is a schematic sectional view showing an embodiment of the optical recording medium according to the present invention.

FIG. 1 is a partially cut away schematic perspective view showing an embodiment of the optical recording medium according to the present invention. FIG. 2 is an enlarged sectional view showing a portion A shown in FIG. 1.

Referring to the Figure, the optical recording medium 1 according to the present invention comprises a light transparent substrate 2 or a substrate having a light transmission on which spiral groove 2a has been formed, a light absorbing layer 4 disposed on one suface side of the light transparent substrate 2 on which the spiral groove 2a has been formed, a light reflection layer 6 disposed on the light absorbing layer 4, and a protection layer 8 disposed on the light reflection layer 6.

The light transparent substrate 2 may for example be formed by use of an injection molding method using a transparent resin such as a polycarbonate resin (PC), and a polymethylmethacrylate resin (PMMA). Such a light transparent substrate 2 may preferably have a thickness of about 1.0 to 1.5 mm.

The light absorbing layer 4 to be formed on the light transparent substrate 2 may preferably comprise a thin film comprising an organic coloring matter (or organic colorant). The organic coloring matter to be used for such a purpose may be one selected from various coloring matters such as a cyanine type coloring matter and a phthalocyanine type coloring matter. For example, the above cyanine type coloring matter may be a cyanine type coloring matter represented by the following general formula.

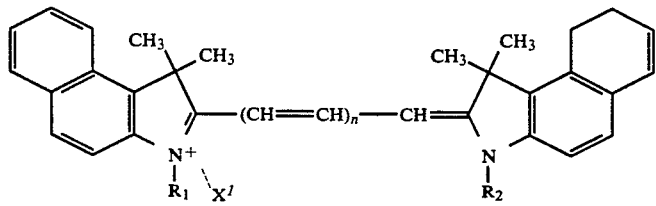

In the above general formula, $R_1$ and $R_2$ respectively denote an alkyl group having 3 to 8 carbon atoms (more preferably 3 to 5 carbon atoms), and $X^-$ denotes a counter ion such as $ClO_4^-$, and $I^-$.

The light absorbing layer 4 comprising an organic coloring matter may for example be formed by use of a known coating method such as a spin coating method. The thus formed light absorbing layer 4 may preferably have a thickness of about 20 to 2000 nm. In the above coating operation, it is possible to use an appropriate solvent which is selected from various known solvents in accordance with the organic coloring matter used for the above purpose. Specific examples thereof may include: diacetone alcohol, ethyl cellosolve, methyl cellosolve, isophorone, methanol, tetrafluoropropanol, etc.

On the above light absorbing layer 4, the light reflection layer 6 is formed. The light reflection layer 6 may comprise a metal such as Au, Ag, Cu, and Al. Such a light reflection layer 6 may preferably be formed by use of one selected from various vacuum film forming (or vacuum vapor deposition) processes and plating processes such as vacuum evaporation, sputtering, and ion plating. The thus formed light reflection layer 6 may preferably have a thickness of about 0.02 to 2.0 μm.

The protection layer 8 is disposed for the purpose of protecting the light absorbing layer 4 and the light reflection layer 6, and may generally be formed by applying a light-curing (or hardening) resin (or a photo-setting resin) on a predetermined surface and hardening the resultant coating. The light-curing resin (photo-setting resin) to be used for such a purpose may be a light-curing resin which is capable of providing a glass transition point of not lower than 110° C. (more preferably 115° to 125° C.), a shrinkage ratio (or shrinkage factor) of not larger than 8% (more preferably 5 to 8%), a humidity permeability (or water vapor permeability) of not higher than 110 g/m²·24 H (more preferably 80 to 110 g/m²·24 H), after it is cured (or hardened). Herein, the shrinkage factor is a value based on a measurement at 25° C., and the water vapor permeability is a value based on a measurement using a 100 μm thick film at 60° C. and 90% RH. Such a light-curing resin may appropriately be selected from various light-curing resins such as an acrylic type resin, a urethane type resin, and a silicone type resin. The protection layer 8 may for example be formed by use of a known coating method such as the spin coating method, and may preferably have a thickness of not larger than 10 μm, more preferably 3 to 8 μm, after being cured.

When the protection layer 8 is formed by use of a light-curing resin which is capable of providing the predetermined performances as described above after being cured, the protection layer 8 does not cause a problem or trouble such as a crack and bonding failure (or local float or local rise) under any of various environmental conditions, when the optical recording medium is produced, stored and used. As a result, the light absorbing layer 4 and the light reflection layer 6 may stably be protected from such an environmental condition.

In addition, it is also possible to dispose an intermediate layer between the light absorbing layer 4 and the light transparent substrate 2. Such an intermediate layer may have a function of protecting the light transparent substrate 2 from a solvent to be used at the time of the formation of the light absorbing layer 4. It is also possible to dispose an intermediate layer between the light absorbing layer 4 and the light reflection layer 6 for the purpose of improving the light absorption efficiency.

As described hereinabove, in the optical recording medium having the above structure, a laser light (beam) for writing is supplied thereto from the transparent substrate side to change the state or configuration of the light absorbing layer (i.e., to form a pit), while the optical recording medium is rotated, whereby a writing operation is effected. On the other hand, a laser light (beam) for reading is supplied to such an optical recording medium from the transparent substrate side and a contrast in the light reflected by the optical recording medium is detected, while the optical recording medium is rotated, whereby a reading operation is effected. The protection layer formed on the light reflection layer is stable or resistant to a change in environmental conditions. Particularly, the light absorbing layer and the light reflection layer may stably be protected from such an environmental change even under a high humidity condition.

Hereinbelow, the present invention will be described in more detail with reference to specific Examples.

EXAMPLE

A polycarbonate substrate as a light transparent substrate having a diameter of 120 mm, and a thickness of 1.2 mm was molded by use of an injection molding process so that the resultant substrate had a spiral groove having a groove pitch of 1.6 μm, a groove width of 0.6 μm, and a groove depth of 600 Å.

Then, a cyanine type coloring matter represented by the following general formula was dissolved in ethyl cellosolve (concentration of coloring matter=30 mg/ml) thereby to prepare a coating liquid. The thus prepared coating liquid was applied onto a surface of the polycarbonate substrate described above on which the spiral groove had been formed, by spin coating method thereby to form a light absorbing layer having a thickness of 100 nm.

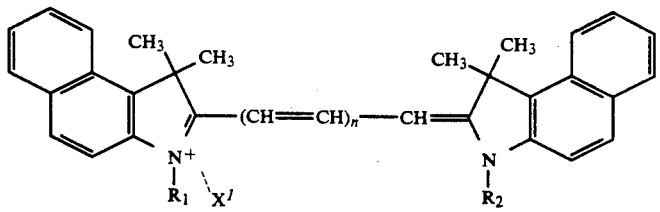

In the above general formula, $R_1$ and $R_2$ denote n-$C_3H_7$ and n-$C_4H_9$, respectively, and $X^-$ denotes $ClO_4^-$.

Thereafter, a light reflection layer having a thickness of 2000 Å and comprising Au was disposed on the light absorbing layer formed above by use of a vacuum evaporation method.

Further, there provided 12 species of light-curing resins shown in the following Table 1. Each of these light-curing resins was applied onto the light reflection layer formed above by use of a spin coating method, and the resultant coating was cured (or hardened) to provide a protection layer having a thickness of about 8 μm, whereby 12 species of optical recording media (Samples 1 to 12) were prepared.

TABLE 1

| Light-curing resin | Glass transition point (°C.) | Shrinkage factor (%) | Water vapor permeability (g/m² · 24 H) |
|---|---|---|---|
| P1 | 120 | 7.6 | 106 |
| P2 | 125 | 7 | 100 |
| P3 | 120 | 5 | 100 |
| P4 | 120 | 7 | 80 |
| P5 | 140 | 7 | 100 |
| P6 | 120 | 3 | 100 |
| P7 | 120 | 7 | 70 |
| P8 | 80 | 7 | 100 |
| P9 | 120 | 9 | 100 |
| P10 | 120 | 7 | 155 |
| P11 | 95 | 10.0 | 125 |
| P12 | 80 | 11.4 | 290 |

By use of each of the 12 species of the optical recording media prepared above, an EFM signal was recorded and reproduced under the following conditions. Then, the optical recording media were left standing in an environment of high temperature and high humidity (70° C. 90% RH) for 250 hours, and thereafter was again subjected to a reproduction operation. In the reproduction operation, the electric potential in the mirror surface portion (Ro), the electric potential in the land/groove portion ($I_l/I_g$), and the tracking error potential (TE) were measured, before and after the standing of the optical recording media, and the variation coefficients (or decreasing coefficient) of these potentials were determined. The thus obtained results are shown in the following Table 2.

(EFM signal recording conditions)
Wavelength: 783 nm
Line speed: 1.4 m/s
Writing power: 7.0 mW
Reading power: 0.5 mW

TABLE 2

| sample | Light curing resin used | Degree of variability in Ro (%) | Degree of variability of $I_l/I_g$ (%) | Degree of variability in TE (%) |
|---|---|---|---|---|
| 1 (Present Invention) | P1 | 0 | 0 | 0 |
| 2 (Present Invention) | P2 | 2 | 1 | 3 |
| 3 (Present Invention) | P3 | 0 | 0 | 1 |
| 4 (Present Invention) | P4 | 1 | 1 | 2 |
| 5 (Present Invention) | P5 | 3 | 2 | 3 |
| 6 (Present Invention) | P6 | 2 | 1 | 3 |
| 7 (Present Invention) | P7 | 0 | 2 | 5 |
| 8 (Comparative Example) | P8 | 13 | 60 | 14 |
| 9 (Comparative Example) | P9 | 5 | 34 | 7 |
| 10 (Comparative Example) | P10 | 12 | 20 | 8 |
| 11 (Comparative Example) | P11 | 19 | 50 | 15 |
| 12 (Comparative Example) | P12 | 27 | 500 | 17 |

As shown in the above Table 2, in each of the Samples 1 to 7, the values of Ro, $I_l/I_g$ and TE were little varied or decreased, even when it was left standing in an environment of high temperature and high humidity for a long period of time. On the other hand, in each of the Samples 8 to 12, at least one item of Ro, $I_l/I_g$ and TE was varied or decreased, when it was left standing in an environment of high temperature and high humidity for a long period of time. Accordingly, it was confirmed that the light absorbing layer and the light reflection layer were stably protected from an environmental change, when the protection layer was formed by use of a light curing resin which was capable of providing a glass transition temperature of not lower than 110° C., a shrinkage factor of not larger than 8% and a water vapor permeability of not higher than 110 g/m²·24 H after being cured (or hardened). In addition, when the results obtained in the Samples 1 to 4 were compared with those obtained in the Samples 5 to 7, it was confirmed that the protection effect of the protection layer was further improved, when the light curing resin for forming the protection layer was one which was capable of providing a glass transition temperature in the range of 115° to 125° C., a shrinkage ratio (or shrinkage factor) in the range of 5 to 8%, and a humidity permeability (or water vapor permeability) in the range of 80 to 110 g/m²·24 H after being cured.

What is claimed is:

1. An optical recording medium comprising a light transparent substrate, a light absorbing layer disposed on the light transparent substrate, a light reflection layer disposed on the light absorbing layer and a protection layer disposed on the light reflection layer, wherein the protection layer is formed by curing a photo-setting resin selected from an acrylic resin, a urethane resin or a silicone resin, and which is capable of providing a glass transition point of not lower than 110° C., a shrinkage factor of not larger than 8%, and a water vapor permeability of not higher than 110 g/m²·24 H after being cured.

2. An optical recording medium according to claim 1, wherein the photo-setting resin is capable of providing a glass transition point in the range of 115° to 125° C., a shrinkage factor in the range of 5 to 8%, and a water vapor permeability in the range of 80 to 110 g/m²·24 H after being cured.

3. An optical recording medium according to claim 1, wherein the protection layer has a thickness of 3 to 8 μm.

4. An optical recording medium according to claim 1, wherein the light absorbing layer comprises an organic coloring matter.

5. An optical recording medium according to claim 4, wherein the organic coloring matter comprises a cyanine type coloring matter.

6. An optical recording medium according to claim 5, wherein the cyanine type coloring matter is represented by the following general formula:

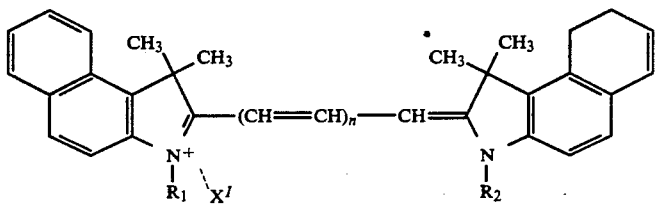

wherein $R_1$ and $R_2$ respectively represent an alkyl group having 3 to 8 carbon atoms, and $X^-$ represents a counter ion.

7. An optical recording medium according to claim 6, wherein $R_1$ and $R_2$ respectively represent an alkyl group having 3 to 5 carbon atoms, and $X^-$ represents a counter ion selected from $ClO_4^-$ or $I^-$.

8. An optical recording medium according to claim 1, wherein the light absorbing layer has a thickness of 20 to 2000 nm.

9. An optical recording medium according to claim 1, wherein the light reflection layer has a thickness of 0.02 to 2.0 μm.

* * * * *